United States Patent
Hirose et al.

(10) Patent No.: US 11,330,367 B2
(45) Date of Patent: May 10, 2022

(54) SOUND PICKUP DEVICE, SOUND PICKUP METHOD, AND PROGRAM

(71) Applicant: Panasonic Intellectual Property Management Co., Ltd., Osaka (JP)

(72) Inventors: Yoshifumi Hirose, Kyoto (JP); Masahiro Nakanishi, Kyoto (JP); Yusuke Adachi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/730,982

(22) Filed: Dec. 30, 2019

(65) Prior Publication Data

US 2020/0137491 A1 Apr. 30, 2020

Related U.S. Application Data

(63) Continuation of application No. PCT/JP2018/024996, filed on Jul. 2, 2018.

(30) Foreign Application Priority Data

Aug. 30, 2017 (JP) .............................. JP2017-165717

(51) Int. Cl.
*H04R 3/00* (2006.01)
*G06T 7/70* (2017.01)
(Continued)

(52) U.S. Cl.
CPC .............. *H04R 3/005* (2013.01); *G06T 7/70* (2017.01); *G06V 10/60* (2022.01); *G06V 40/10* (2022.01);
(Continued)

(58) Field of Classification Search
CPC ...... H04R 3/005; H04R 1/406; H04R 29/005; G06K 9/4661; G06K 9/00228; G06K 9/00362; G06T 7/70
(Continued)

(56) References Cited

U.S. PATENT DOCUMENTS

2011/0232989 A1* 9/2011 Lee .................. H04N 7/147
181/125
2014/0368422 A1 12/2014 Gupta et al.
(Continued)

FOREIGN PATENT DOCUMENTS

JP 2005-141687 6/2005
JP 2012-512413 5/2012
(Continued)

OTHER PUBLICATIONS

Extended European Search Report dated May 15, 2020 for the related European Patent Application No. 18850643.0.
(Continued)

*Primary Examiner* — Paul Kim
(74) *Attorney, Agent, or Firm* — McDermott Will & Emery LLP

(57) ABSTRACT

A sound pickup device is a device that picks up target sound that has been output from an object serving as a sound source. The sound pickup device includes a controller that generates object location information indicating a location of the object on the basis of image data of a camera, generates sound-source location information indicating a location of the sound source on the basis of an acoustic signal of a microphone array, sets a weight for the object location information in accordance with an image capturing state of the camera, and determines a direction in which the target sound is to be picked up on the basis of the object location information, the weight for the object location information, and the sound-source location information.

13 Claims, 17 Drawing Sheets

(51) Int. Cl.
*H04R 1/40* (2006.01)
*H04R 29/00* (2006.01)
*G06V 10/60* (2022.01)
*G06V 40/10* (2022.01)
*G06V 40/16* (2022.01)

(52) U.S. Cl.
CPC ........... *G06V 40/161* (2022.01); *H04R 1/406* (2013.01); *H04R 29/005* (2013.01)

(58) Field of Classification Search
USPC .......................................................... 381/92
See application file for complete search history.

(56) References Cited

U.S. PATENT DOCUMENTS

| | | | | |
|---|---|---|---|---|
| 2016/0064000 | A1* | 3/2016 | Mizumoto | G06K 9/4647 704/233 |
| 2017/0085771 | A1* | 3/2017 | Schwager | G01S 13/867 |
| 2018/0232201 | A1* | 8/2018 | Holtmann | A61B 5/1113 |

FOREIGN PATENT DOCUMENTS

| | | |
|---|---|---|
| JP | 5215826 B | 6/2013 |
| JP | 2016-051081 | 4/2016 |
| JP | 2016-521894 | 7/2016 |
| KR | 10-2017022709 A | 3/2017 |
| WO | 2010/070556 | 6/2010 |
| WO | 2014/201427 | 12/2014 |

OTHER PUBLICATIONS

Lo D et al., "Robust Joint Audio-Video Localization in Video Conferencing Using Reliability Information," IEEE Transactions on Instrumentation and Measurement, IEEE Service Center, Piscataway, NJ, US, vol. 53, No. 4, Aug. 1, 2004, pp. 1132-1139, XP001221381.
International Search Report of PCT application No. PCT/JP2018/024996 dated Sep. 11, 2018.
The EPC Office Action dated May 21, 2021 for the related European Patent Application No. 18850643.0.

* cited by examiner

# SOUND PICKUP DEVICE, SOUND PICKUP METHOD, AND PROGRAM

TECHNICAL FIELD

The present disclosure relates to a sound pickup device, a sound pickup method, and a program for picking up target sound.

BACKGROUND ART

PTL 1 discloses an estimation apparatus that estimates which participant has made an utterance and when the participant has made the utterance on the basis of data recording conversation made by one or more participants. This estimation apparatus integrates information obtained from an acoustic signal that has been output from a microphone with information obtained from a video signal that has been output from a camera so as to calculate a probability of a conversation participant having made an utterance. By doing this, even in a case where a conversation participant has moved without any utterance, a location of the conversation participant can be traced.

CITATION LIST

Patent Literature

PTL 1: Japanese Patent No. 5215826

SUMMARY

The present disclosure provides a sound pickup device, a sound pickup method, and a program that cause improvements in precision of picking up target sound.

A sound pickup device in one aspect of the present disclosure is a sound pickup device that picks up target sound that has been output from an object serving as a sound source. The sound pickup device includes a first input unit, a second input unit, and a controller. The first input unit receives image data that has been generated by a camera. The second input unit receives an acoustic signal that has been output from a microphone array. The controller determines a direction in which the target sound is to be picked up. The controller includes a detector, an estimator, a weighting unit, and a determination unit. The detector detects a location in at least one of a horizontal direction and a vertical direction of the object on the basis of the image data, and outputs object location information including information that indicates the detected location of the object. The estimator estimates a location in at least one of a horizontal direction and a vertical direction of the sound source on the basis of the acoustic signal, and outputs sound-source location information including information that indicates the estimated location of the sound source. The weighting unit sets a weight for the object location information in accordance with an image capturing state of the camera. The determination unit determines the direction in which the target sound is to be picked up on the basis of the object location information, the weight for the object location information, and the sound-source location information.

These general and specified aspects may be achieved by a system, a method, and a computer program, and any combination of the system, the method, and the computer program.

By employing a sound pickup device, a sound pickup method, and a program according to the present disclosure, a sound pickup direction is determined according to an image capturing state of a camera and a sound receiving state of a microphone array, and therefore precision of picking up target sound is improved.

DESCRIPTION OF EMBODIMENTS

Knowledge Underlying the Present Disclosure

In the estimation apparatus of PTL 1, in order to precisely calculate a probability of a conversation participant having made an utterance, it is requested that information obtained from a video signal that has been output from a camera and information obtained from an acoustic signal that has been output from a microphone be accurate. Therefore, in a case where the information obtained from the video signal and the information obtained from the acoustic signal are not accurate, the probability of the conversation participant having made an utterance fails to be precisely calculated.

The present disclosure provides a sound pickup device that improves precision of picking up target sound even in a case where information obtained from a video signal that has been output from a camera and information obtained from an acoustic signal that has been output from a microphone array have poor precision. Specifically, a sound pickup device according to the present disclosure sets a weight according to an image capturing state of a camera for information obtained from a video signal, and sets a weight according to a sound receiving state of a microphone array for information obtained from an acoustic signal. By doing this, the sound pickup device according to the present disclosure precisely determines a direction in which target sound will be picked up.

First Exemplary Embodiment

A first exemplary embodiment is described below with reference to the drawings. In the present exemplary embodiment, an example is described where a person's speech is picked up as target sound. In the present exemplary embodiment, a weight according to an image capturing state of a camera is set on the basis of confidence indicating how confident it is that a person's face is included in image data. In addition, a weight according to a sound receiving state of a microphone array is set on the basis of confidence indicating how confident it is that target sound is included in an acoustic signal. The "confidence" refers to a degree of confidence.

1. Configuration of Sound Pickup Device

Figure 1:
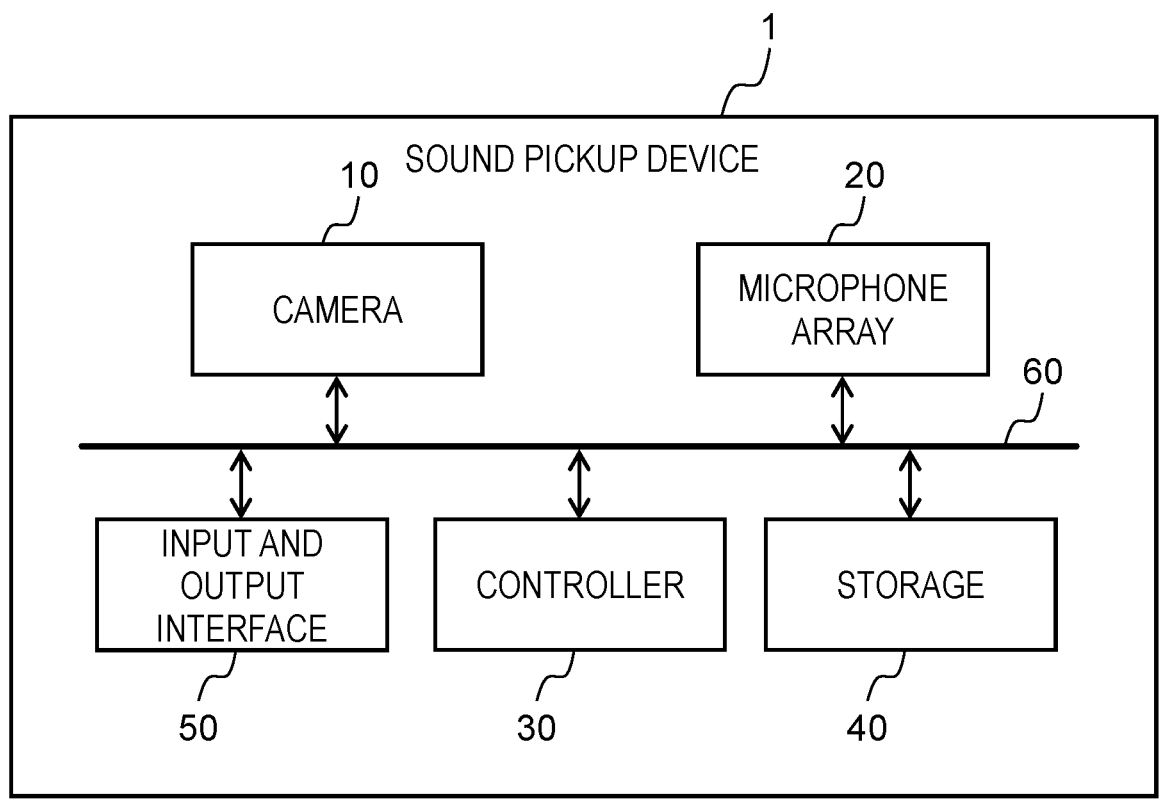
FIG. 1 is a block diagram illustrating a configuration of a sound pickup device according to a first exemplary embodiment.

FIG. 1 illustrates a configuration of a sound pickup device according to a first exemplary embodiment of the present disclosure. Sound pickup device 1 includes camera 10, microphone array 20, controller 30, storage 40, input and output interface 50, and bus 60. Sound pickup device 1 picks up, for example, a person's speech during a conference. As an example, sound pickup device 1 is dedicated sound pickup equipment in which camera 10, microphone array 20, controller 30, storage 40, input and output interface 50, and bus 60 are integrated with each other.

In another example, sound pickup device 1 may not incorporate one of camera 10 and microphone array 20, or may not incorporate either camera 10 or microphone array 20. In this case, sound pickup device 1 is electrically connected to camera 10 or microphone array 20 that is externally attached. For example, sound pickup device 1 may be an electronic device such as a smartphone including camera 10, and may be electrically and mechanically connected to an external device including microphone array 20.

Camera 10 includes a charge-coupled device (CCD) image sensor, a complementary metal oxide semiconductor (CMOS) image sensor, an N-channel metal oxide semiconductor (NMOS) image sensor, or the like. Camera 10 generates and outputs image data serving as a video signal.

Microphone array 20 includes a plurality of microphones. Microphone array 20 receives acoustic waves, converts the acoustic waves into an acoustic signal serving as an electric signal, and outputs the acoustic signal.

Controller 30 determines a sound pickup direction on the basis of the image data obtained from camera 10 and the acoustic signal obtained from microphone array 20. Controller 30 extracts target sound from the acoustic signal on the basis of the determined sound pickup direction. Controller 30 can be implemented by a semiconductor element or the like. Controller 30 can be configured, for example, by a microcomputer, a central processing unit (CPU), a microprocessor unit (MPU), a digital signal processor (DSP), a field programmable gate array (FPGA), or an application specific integrated circuit (ASIC).

Storage 40 stores the image data obtained from camera 10 and the acoustic signal obtained from microphone array 20. Storage 40 can be implemented, for example, by a hard disk (HDD), a solid state drive (SSD), a random access memory (RAM), a dynamic random access memory (DRAM), a ferroelectric memory, a flash memory, a magnetic disk, or any combination of these.

Input and output interface 50 includes a circuit that performs communication with an external device in conformity with a predetermined communication standard (such as local area network (LAN), WiFi, Bluetooth (registered trademark), universal serial bus (USB), or high-definition multimedia interface (HDMI) (registered trademark)).

Bus 60 is a signal line that electrically connects camera 10, microphone array 20, controller 30, storage 40, and input and output interface 50.

When controller 30 extracts the image data from storage 40, controller 30 is equivalent to an input unit of the image data. When controller 30 extracts the acoustic signal from storage 40, controller 30 is equivalent to an input unit of the acoustic signal. When input and output interface 50 receives an input of the image data from camera 10 externally attached to sound pickup device 1, input and output interface 50 is equivalent to an input unit of the image data. When input and output interface 50 receives an input of the acoustic signal from microphone array 20 externally attached to sound pickup device 1, input and output interface 50 is equivalent to an input unit of the acoustic signal.

Figure 2:
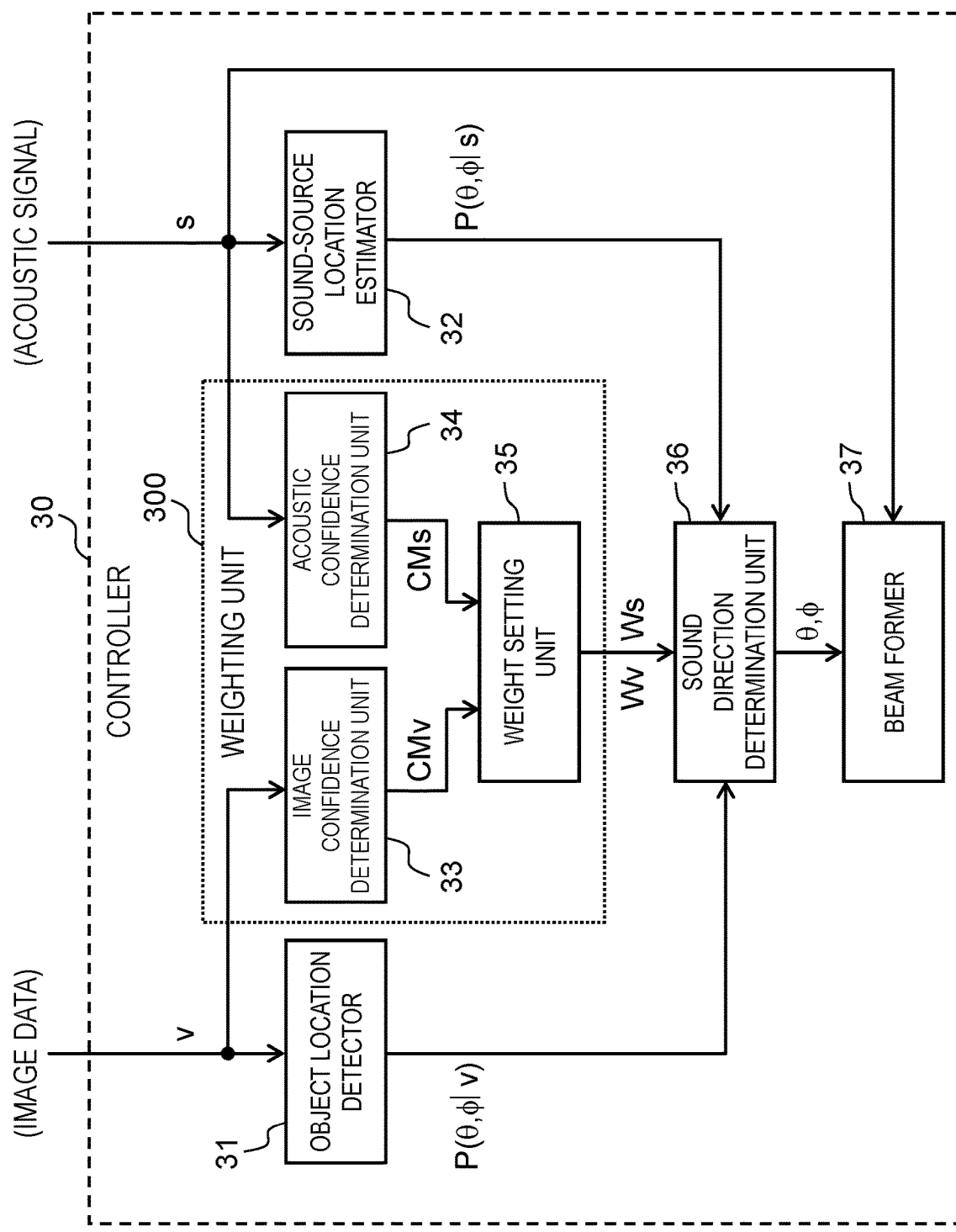
FIG. 2 is a block diagram illustrating functions of a controller according to the first exemplary embodiment.

FIG. 2 illustrates functions of controller 30. The functions of controller 30 may be configured by only hardware, or may be implemented by a combination of hardware and software.

Controller 30 includes object location detector 31, sound-source location estimator 32, weighting unit 300, sound direction determination unit 36, and beam former 37.

Object location detector 31 detects a location of an object from image data v generated by camera 10. In the present exemplary embodiment, an object to be detected is a person's face. Object location detector 31 outputs object location information serving as information indicating the detected location of the object. Specifically, the object location information is information indicating probability $P(\theta, \varphi|v)$ of a face being indicated in an image of each of a plurality of regions in image data v that is equivalent to one frame of a moving image or one still image. A location of a coordinate system of each of the plurality of regions in image data v is associated with horizontal angle $\theta$ and vertical angle $\varphi$ of an angle of view of camera 10 on the basis of setting information of camera 10.

Sound-source location estimator 32 estimates a location of a sound source from acoustic signal s obtained from microphone array 20. In the present exemplary embodiment, the sound source is a person who makes a speech. Sound-source location estimator 32 outputs sound-source location information serving as information indicating the estimated location of the sound source. Specifically, the sound-source location information is information indicating probability $P(\theta, \varphi|s)$ of the presence of a sound source in a location specified by horizontal angle $\theta$ and vertical angle $\varphi$.

Weighting unit 300 weights probability $P(\theta, \varphi|v)$ serving as the object location information on the basis of image data v. Weighting unit 300 also weights probability $P(\theta, \varphi|s)$ serving as the sound-source location information on the basis of acoustic signal s.

Weighting unit 300 includes image confidence determination unit 33, acoustic confidence determination unit 34, and weight setting unit 35. Image confidence determination unit 33 determines image confidence CMv on the basis of image data v. Image confidence CMv is confidence indicating how confident it is that a face is included in image data v. Stated another way, image confidence CMv indicates reliability of probability $P(\theta, \varphi|v)$ serving as the object location information. Acoustic confidence determination unit 34 determines acoustic confidence CMs on the basis of acoustic signal s. Acoustic confidence CMs is confidence indicating how confident it is that speech serving as target sound is included in an acoustic signal. Stated another way, acoustic confidence CMs indicates reliability of probability $P(\theta, \varphi|s)$ serving as the sound-source location information.

Weight setting unit 35 sets weight Wv for the object location information on the basis of image confidence CMv. Weight Wv for the object location information that has been set on the basis of image confidence CMv has a value according to an image capturing state of camera 10. Weight setting unit 35 sets weight Ws for the sound-source location information on the basis of acoustic confidence CMs. Weight Ws for the sound-source location information that has been set on the basis of acoustic confidence CMs has a value according to a sound receiving state of microphone array 20.

Sound direction determination unit 36 determines a sound pickup direction on the basis of probability $P(\theta, \varphi|v)$ serving as the object location information and weight Wv for probability $P(\theta, \varphi|v)$, and probability $P(\theta, \varphi|s)$ serving as the sound-source location information and weight Ws for probability $P(\theta, \varphi|s)$.

Beam former 37 extracts target sound from acoustic signal s on the basis of the determined sound pickup direction. This enables noise-reduced and clear speech to be picked up.

Figure 3A:
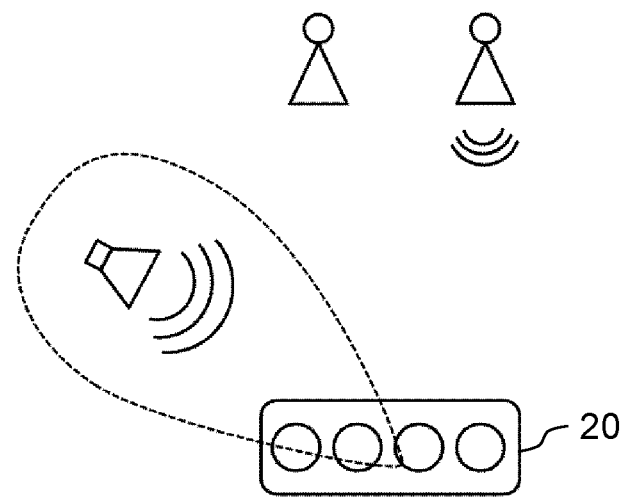
FIG. 3A is a diagram for explaining a sound pickup direction in a case where only a microphone array is used.
Figure 3B:
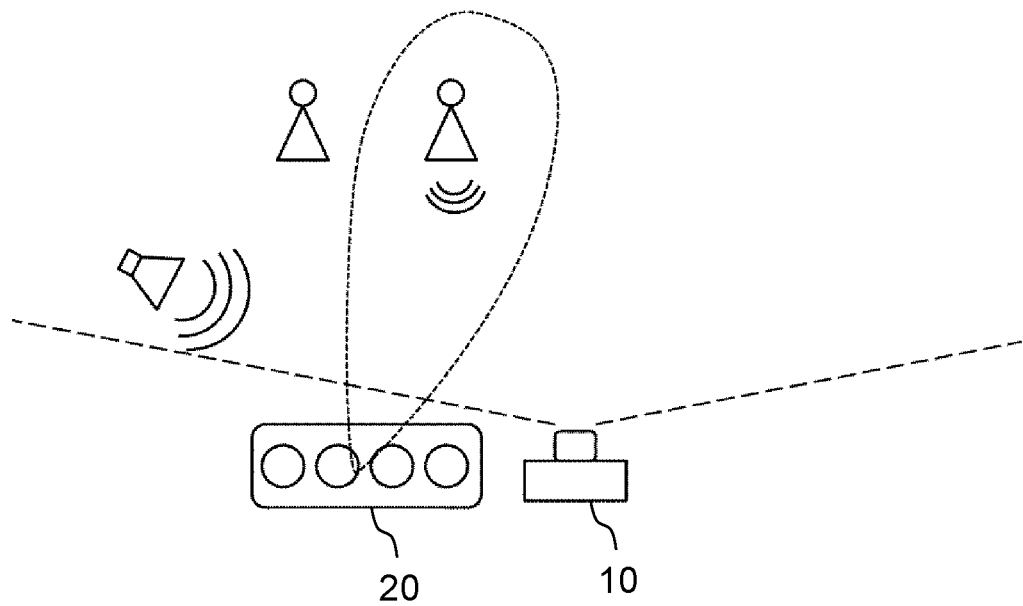
FIG. 3B is a diagram for explaining a sound pickup direction in a case where a microphone array and a camera are used.

FIG. 3A schematically illustrates a sound pickup direction in a case where only microphone array 20 is used. FIG. 3B schematically illustrates a sound pickup direction in a case where microphone array 20 and camera 10 are used. As illustrated in FIG. 3A, in a case where a sound pickup direction is determined by only using an acoustic signal output from microphone array 20, when ambient noise (sound of a speaker) is louder than a person's speech, a direction of noise is detected as a direction of a sound source. In this case, loud noise is picked up, and the person's speech fails to be clearly picked up. However, as illustrated in FIG. 3B, in a case where camera 10 is also used, a location of a person's face included in image data of camera 10 is detected, and this enables a direction in which the person is present to be specified as a direction of a sound source.

On the other hand, precision of detection of a face location obtained from image data v changes according to an image capturing state of camera 10. For example, in some cases, image data v that has been generated by capturing an image in a dark environment causes a face location to be erroneously detected. Therefore, in the present exemplary embodiment, probability $P(\theta, \varphi|v)$ of a face is weighted according to the image capturing state of camera 10. In addition, precision of estimation of a sound-source location obtained from acoustic signal s changes according to a sound receiving state of microphone array 20. For example, when noise is excessively loud, a location of a sound source of target sound fails to be accurately estimated from acoustic signal s in some cases. Therefore, in the present exemplary embodiment, probability $P(\theta, \varphi|s)$ of a sound source is weighted according to the sound receiving state of microphone array 20. Then, a sound pickup direction is determined on the basis of weighted probabilities $P(\theta, \varphi|v)$, $P(\theta, \varphi|s)$.

2. Operation of Sound Pickup Device

Figure 4:
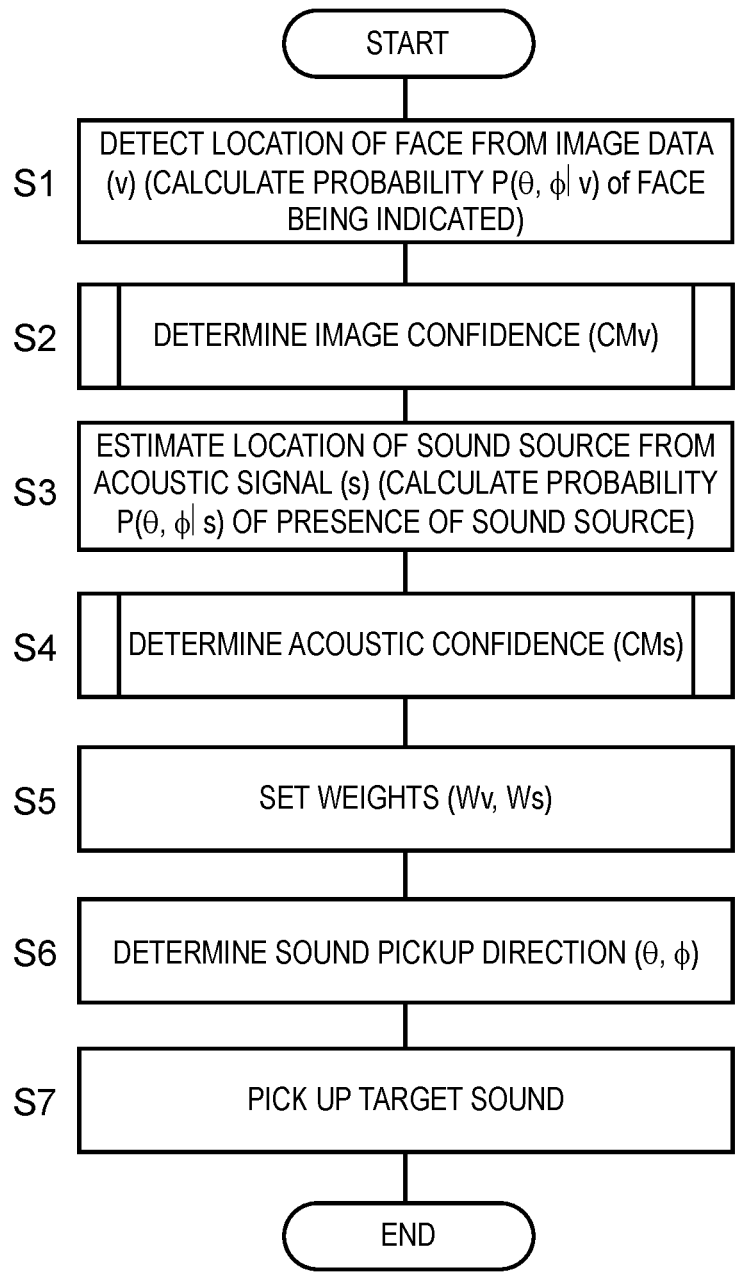
FIG. 4 is a flowchart illustrating a sound pickup method according to the first exemplary embodiment.

FIG. 4 illustrates a sound pickup operation of controller 30.

Object location detector 31 detects a location of a face on the basis of image data v that has been generated by camera 10 (S1). Specifically, object location detector 31 calculates probability $P(\theta, \varphi|v)$ of a face being indicated in an image located in a location specified by horizontal angle $\theta$ and vertical angle $\varphi$ in image data v. An arbitrary method is used to detect the location of the face. As an example, the location of the face is detected by dividing image data v that is equivalent to one frame of a moving image or one still image into a plurality of regions and determining whether each of the plurality of regions matches features of a face (see "Rapid Object Detection using a Boosted Cascade of Simple Features", ACCEPTED CONFERENCE ON COMPUTER VISION AND PATTERN RECOGNITION, 2001). This face detection method is described below.

Figure 5:
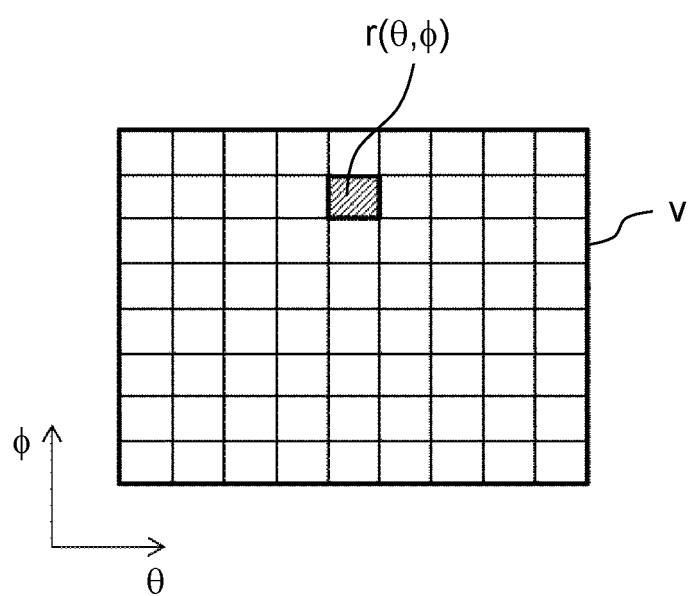
FIG. 5 is a diagram for explaining a region serving as a unit of detection of a face location.

FIG. 5 illustrates region $r(\theta, \varphi)$ serving as a unit of detection of a face location in image data v. Object location detector 31 divides image data v into a plurality of regions $r(\theta, \varphi)$, and determines whether an image of each of the plurality of regions $r(\theta, \varphi)$ indicates a face. In FIG. 5, image data v is divided in a lattice shape, and respective axes are associated with $\theta$ and $\varphi$. However, in a case where an all-round camera is used, $\theta$ and $\varphi$ may be associated circumferentially.

Figure 6:
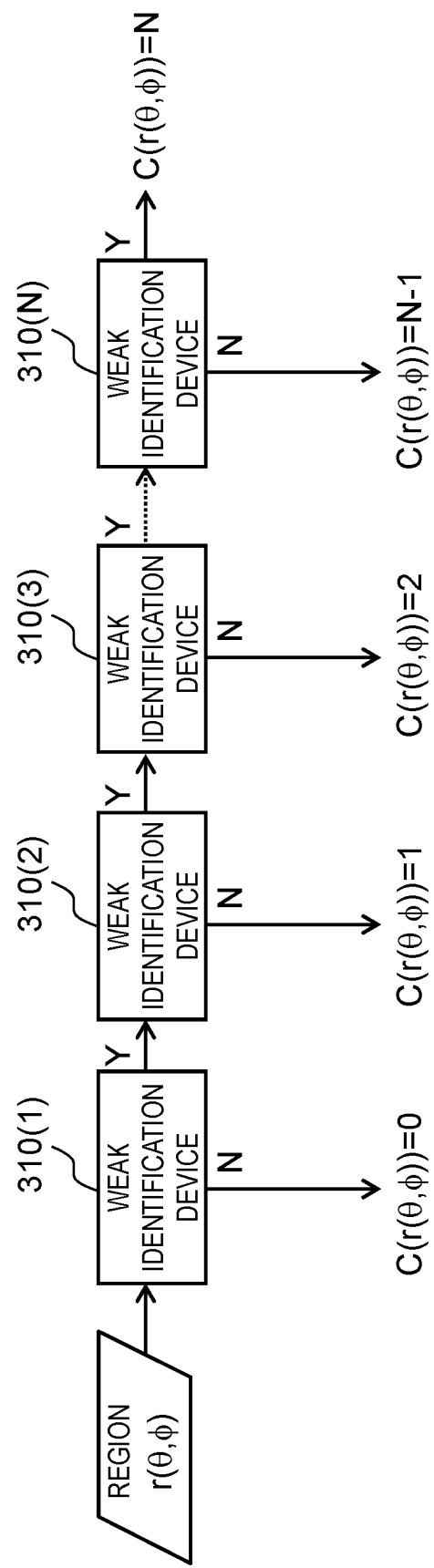
FIG. 6 is a diagram for explaining identification of a face.

FIG. 6 illustrates an example of identification of a face. Object location detector 31 includes, for example, N weak identification devices 310 (weak identification devices 310 (1) to 310(N)). Each of weak identification devices 310(1) to 310(N) has information indicating features of a face. N weak identification devices 310 have respective different pieces of information indicating features of a face. Object location detector 31 calculates a number of times $C(r(\theta, \varphi))$ of determining that region $r(\theta, \varphi)$ indicates a face. Specifically, object location detector 31 first determines whether region $r(\theta, \varphi)$ indicates a face by using first weak identification device 310(1). In a case where weak identification device 310(1) has determined that region $r(\theta, \varphi)$ does not indicate a face, "$C(r(\theta, \varphi))=0$" is established. In a case where first weak identification device 310(1) has determined that region $r(\theta, \varphi)$ indicates a face, second weak identification device 310(2) determines whether region $r(\theta, \varphi)$ indicates a face by using information indicating features of a face that is different from information used by first weak identification device 310(1). In a case where second weak identification device 310(2) has determined that region $r(\theta, \varphi)$ indicates a face, third weak identification device 310(3) determines whether region $r(\theta, \varphi)$ indicates a face. As described above, in image data v that is equivalent to one frame of a moving image or one still image, whether a face is indicated is determined for each of regions $r(\theta, \varphi)$ by using N weak identification devices 310. For example, in a case where all of N weak identification devices 310 have determined that region $r(\theta, \varphi)$ indicates a face, a number of times of determining that a face is indicated is "$C(r(\theta, \varphi))=N$".

A size of region $r(\theta, \varphi)$ at the time of detection of a face may be fixed, or may be variable. For example, the size of region r(θ, φ) at the time of detection of a face may change for each image data v of one frame of a moving image or one still image.

Object location detector 31 determines whether a face is indicated, for all of regions r(θ, φ) in image data v. Then, object location detector 31 calculates probability P(θ, φ|v) of a face being indicated in an image located in a location specified by horizontal angle θ and vertical angle φ in image data v, by using Formula (1) described below.

[Formula 1]

$$P(\theta, \varphi \mid v) = \frac{1}{N} C(r(\theta, \varphi)) \tag{1}$$

In a case where a location of a face can be detected by only using horizontal angle θ, probability P(θ|v) of a face may be calculated according to Formula (2) described below.

[Formula 2]

$$P(\theta \mid v) = \sum_{\varphi} \frac{1}{N} C(r(\theta, \varphi)) \tag{2}$$

Figure 7:
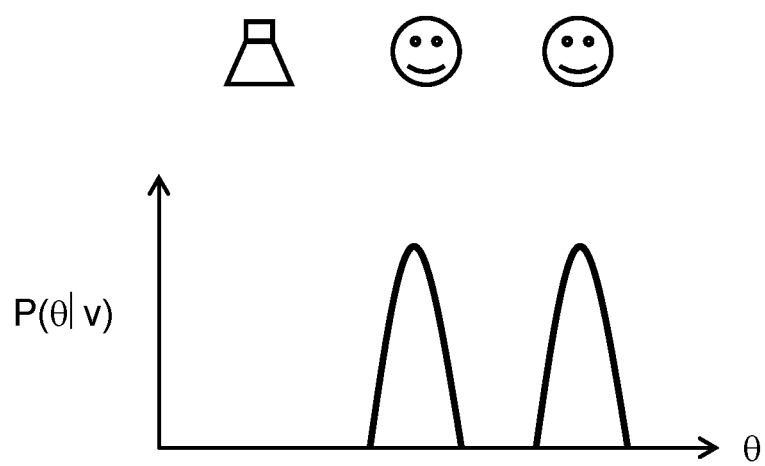
FIG. 7 is a diagram for explaining a probability of a face.

FIG. 7 exemplifies probability P(θ|v) of a face being indicated in an image located in a location specified by horizontal angle θ in image data v. It is indicated that, as probability P(θ|v) increases, a probability of the presence of a face at horizontal angle θ increases.

As illustrated in FIG. 4, when a location of a face is detected by object location detector 31, image confidence determination unit 33 determines image confidence CMv indicating how confident it is that a face is included in image data v (S2). Specifically, image confidence determination unit 33 sets image confidence CMv on the basis of image data v generated by camera 10. Determination of image confidence CMv (S2) may be performed before detection of the location of a face (S1).

Figure 8:
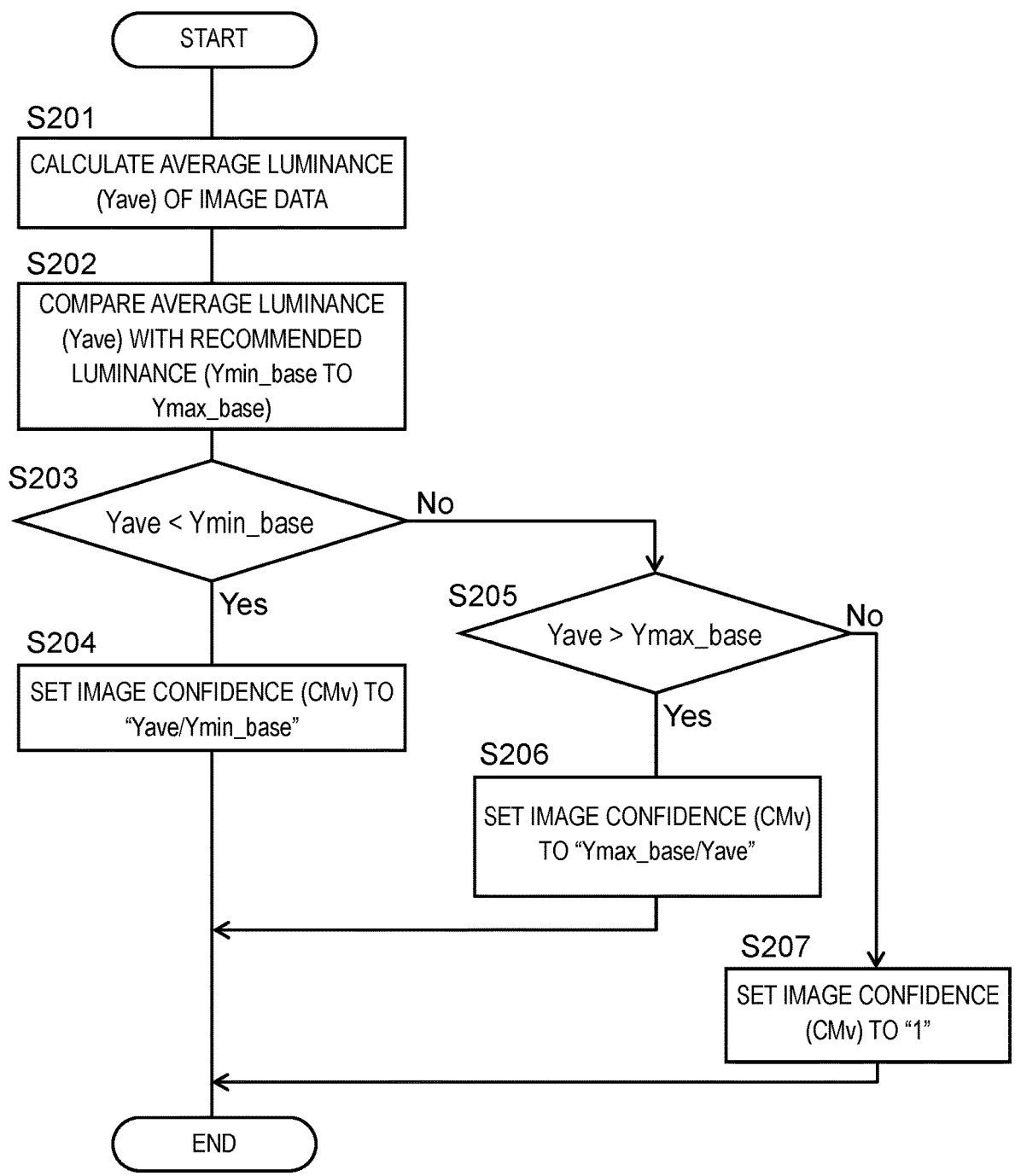
FIG. 8 is a flowchart illustrating determination of image confidence.

FIG. 8 illustrates an example of a method for determining image confidence CMv (details of S2). In the example of FIG. 8, image confidence determination unit 33 determines image confidence CMv on the basis of average luminance Yave of image data v. First, image confidence determination unit 33 calculates average luminance Yave of image data v (S201). Then, image confidence determination unit 33 compares average luminance Yave with recommended luminance (Ymin_base to Ymax_base) (S202). The recommended luminance has a range from minimum recommended luminance (Ymin_base) to maximum recommended luminance (Ymax_base). Information indicating the recommended luminance is stored in storage 40 in advance. If average luminance Yave is lower than the minimum recommended luminance (Yes in S203), image confidence determination unit 33 sets image confidence CMv to "Yave/Ymin_base" (S204). If average luminance Yave is higher than the maximum recommended luminance (Yes in S205), image confidence determination unit 33 sets image confidence CMv to "Ymax_base/Yave" (S206). If average luminance Yave falls within a range of the recommended luminance (No in S205), image confidence determination unit 33 sets image confidence CMv to "1" (S207). If average luminance Yave is lower than minimum recommended luminance Ymin_base, or is higher than maximum recommended luminance Ymax_base, a face is erroneously detected in some cases. Therefore, when average luminance Yave falls within the range of the recommended luminance, image confidence CMv is set to the maximum value "1". As average luminance Yave becomes higher or lower than the recommended luminance, image confidence CMv is reduced.

As illustrated in FIG. 4, sound-source location estimator 32 estimates a location of a sound source on the basis of acoustic signal s that has been output from microphone array 20 (S3). Specifically, object location detector 31 calculates probability P(θ, φ|s) of the presence of a sound source in a location specified by horizontal angle θ and vertical angle cp. An arbitrary method is used to estimate a location of a sound source. For example, the location of the sound source can be estimated by using the cross-power spectrum phase analysis (CSP) method or the multiple signal classification (MUSIC) method. An example in which the location of the sound source is estimated by using the CSP method is described below.

Figure 9:
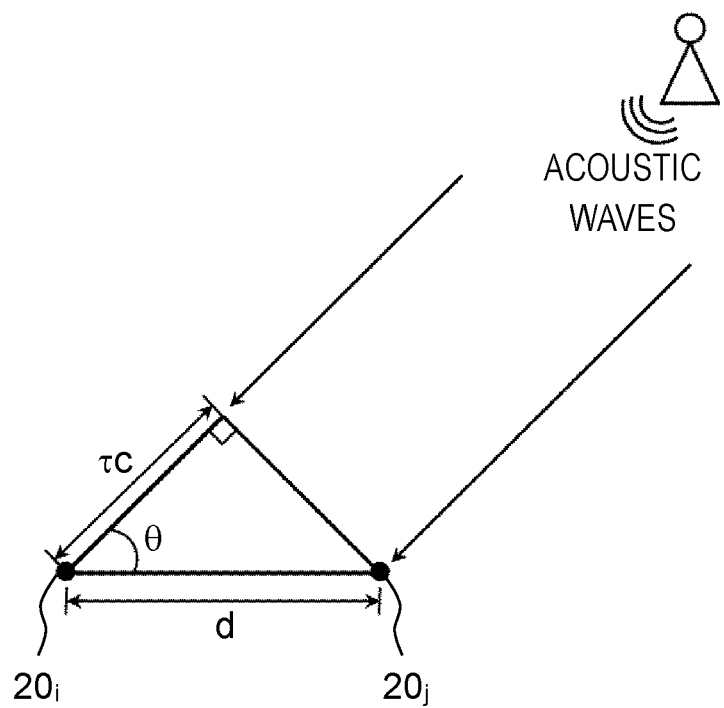
FIG. 9 is a diagram for explaining estimation of a location of a sound source.

FIG. 9 schematically illustrates a state where a person's speech (acoustic waves) reaches microphones $20_i$ and $20_j$ of microphone array 20. Time difference τ is generated according to distance d between microphones $20_i$ and $20_j$ when acoustic waves reach microphones $20_i$ and $20_j$.

Sound-source location estimator 32 calculates probability P(θ|s) of the presence of a sound source at horizontal angle θ according to Formula (3) described below that uses a CSP coefficient (a correlation function).

[Formula 3]

$$P(\theta \mid s) = CSP(\tau) \tag{3}$$

Here, the CSP coefficient can be obtained according to Formula (4) described below (see "Localization of Multiple Sound Sources Based on CSP Analysis with a Microphone Array", IEICE Transactions, D-II, Vol. J83-D-II, No. 8, pp. 1713-1721). In Formula (4), n indicates time, $S_i(n)$ indicates an acoustic signal received by microphone $20_i$, and $S_j(n)$ indicates an acoustic signal received by microphone $20_j$. In Formula (4), DFT indicates discrete Fourier transform. In addition, * indicates a conjugate complex number.

[Formula 4]

$$CSP_{i,j}(\tau) = DFT^{-1}\left[\frac{DFT[s_i(n)]DFT[s_j(n)]*}{|DFT[s_i(n)]||DFT[S_j(n)]|}\right] \tag{4}$$

Time difference τ is expressed according to Formula (5) by using speed of sound c, distance d between microphones $20_i$, $20_j$, and sampling frequency F.

[Formula 5]

$$\tau = \frac{dF_s}{c}\cos(\theta) \tag{5}$$

Therefore, as expressed by Formula (6), probability P(θ|s) of the presence of a sound source at horizontal angle θ can be calculated by converting the CSP coefficient in Formula (3) from a time axis into a directional axis by using Formula (5).

[Formula 6]

$$P(\theta|s) = CSP\left(\frac{dF_s}{c}\cos(\theta)\right) \quad (6)$$

In the method described above for calculating probability P(θ|s), an example where two microphones 20*i* and 20*j* are used has been described. However, probability P(θ|s) of the presence of a sound source may be calculated by using two or more microphones. In addition, probability P(θ|s) of the presence of a sound source at vertical angle φ can be calculated by using the CSP coefficient and time difference τ, similarly to probability P(θ|s) at horizontal angle θ. Further, probability P(θ, φ|s) can be calculated on the basis of probability P(θ|s) and probability P(φ|s).

Figure 10:
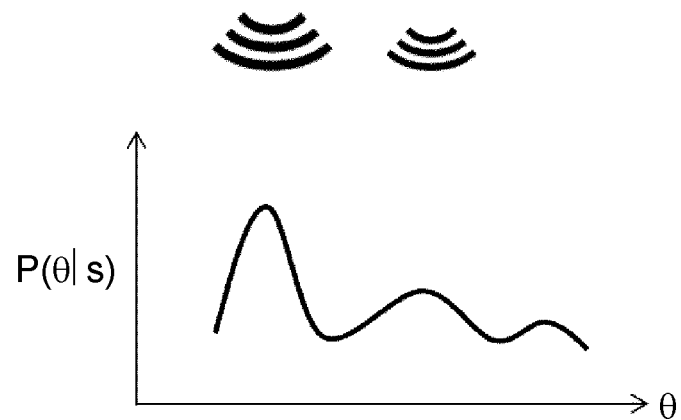
FIG. 10 is a diagram for explaining a probability of a sound source.

FIG. 10 exemplifies probability P(θ|s) of the presence of a sound source at horizontal angle θ. It is indicated that, as probability P(θ|s) increases, a probability of the presence of a sound source of target sound at horizontal angle θ increases.

As illustrated in FIG. 4, when a location of a sound source is estimated by sound-source location estimator 32, acoustic confidence determination unit 34 determines acoustic confidence CMs indicating how confident it is that speech is included in acoustic signal s (S4). Specifically, acoustic confidence determination unit 34 sets acoustic confidence CMs on the basis of acoustic signal s that has been output from microphone array 20. Determination of acoustic confidence CMs (S4) may be performed before estimation of a location of a sound source (S3).

Figure 11:
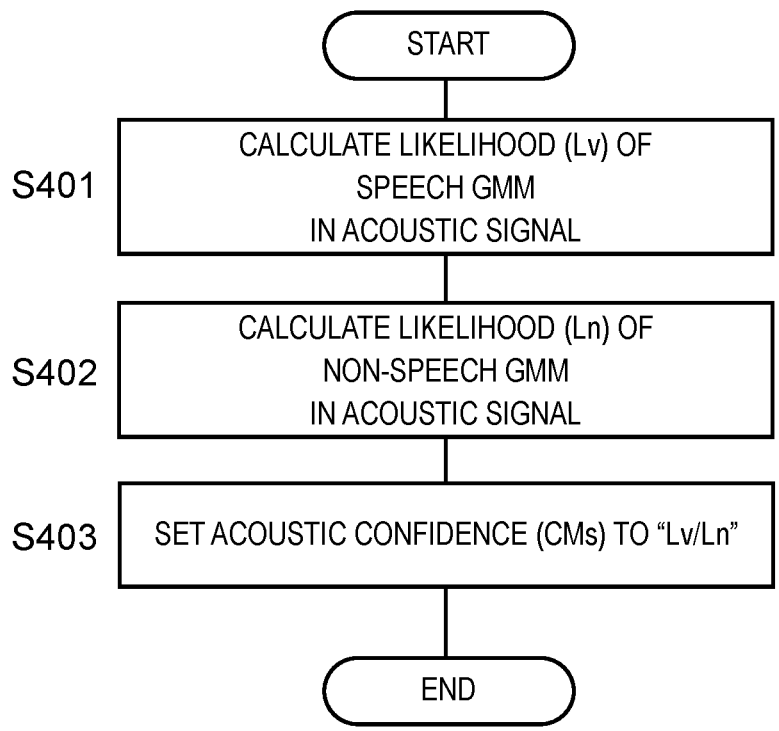
FIG. 11 is a flowchart illustrating determination of acoustic confidence.

FIG. 11 illustrates an example of a method for determining acoustic confidence CMs (details of S4). In the example of FIG. 11, acoustic confidence determination unit 34 determines how confident it is that sound received by microphone array 20 is speech. Specifically, acoustic confidence determination unit 34 calculates acoustic confidence CMs by using a person's speech Gaussian mixture model (GMM) and a non-speech GMM. The speech GMM and the non-speech GMM are learnt and generated in advance. Information indicating the speech GMM and the non-speech GMM is stored in storage 40.

First, acoustic confidence determination unit 34 calculates likelihood Lv of the speech GMM in acoustic signal s (S401). Next, acoustic confidence determination unit 34 calculates likelihood Ln of the non-speech GMM in acoustic signal s (S402). Then, acoustic confidence determination unit 34 sets acoustic confidence CMs in such a way that "CMs=Lv/Ln" (S403).

Figure 12:
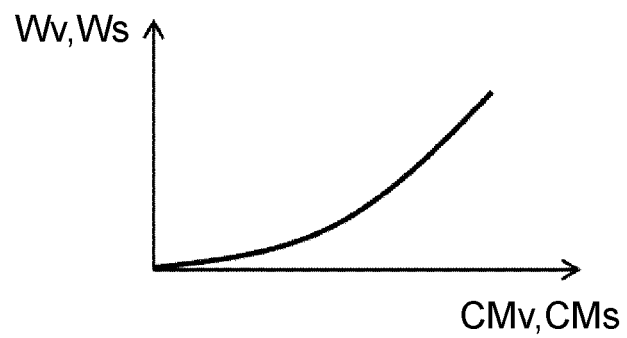
FIG. 12 is a diagram illustrating weights for image confidence and acoustic confidence.

As illustrated in FIG. 4, weight setting unit 35 sets weight Wv for probability P(θ, φ|v) of a face on the basis of image confidence CMv, and sets weight Ws for probability P(θ, φ|s) of a sound source on the basis of acoustic confidence CMs (S5). FIG. 12 illustrates association among image confidence CMv, acoustic confidence CMs, and weights Wv, Ws. As described above, weights Wv, Ws are determined according to condences CMv, CMs by using a monotonically increasing function.

As illustrated in FIG. 4, when weights Wv, Ws are set, sound direction determination unit 36 determines a sound pickup direction (S6). Specifically, sound pickup determination unit 36 calculates probability P(θ, φ) of the presence of a person who is a sound source according to Formula (7) described below, by using probability P(θ, φ|v) of a face and weight Wv for probability P(θ, φ|v), and probability P(θ, φ|s) of a sound source and weight Ws for probability P(θ, φ|s). Then, sound direction determination unit 36 determines, as a sound pickup direction, horizontal angle θ and vertical angle φ that cause probability P(θ, φ) to become maximum, by using Formula (8) described below. Note that a logarithm of probability P(θ, φ|s) can be expressed by Formula (9) described below.

[Formula 7]

$$P(\theta,\varphi)=P(\theta,\varphi|v)^{Wv} \times P(\theta,\varphi|s)^{Ws} \quad (7)$$

[Formula 8]

$$\hat{\theta},\hat{\varphi}=arg\ \max(P(\theta,\varphi)) \quad (8)$$

[Formula 9]

$$\log P(\theta,\varphi))=WvP(\theta,\varphi|v)+WsP(\theta,\varphi|s) \quad (9)$$

Figure 13A:
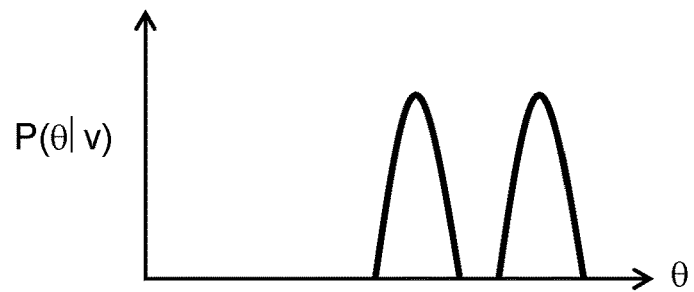
FIG. 13A is a diagram illustrating an example of a probability of a face.
Figure 13B:
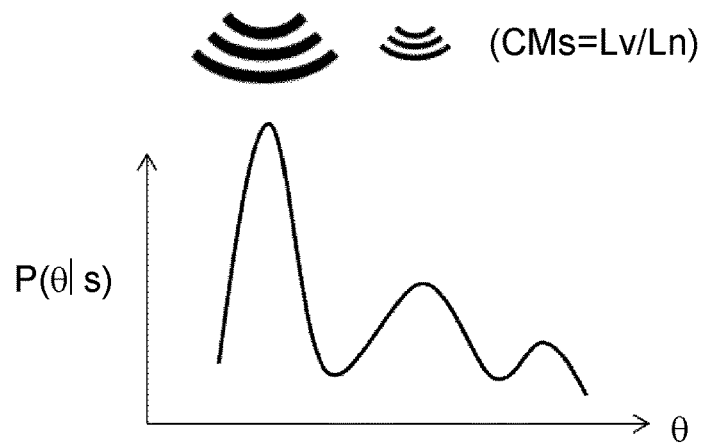
FIG. 13B is a diagram illustrating an example of a probability of a sound source.
Figure 13C:
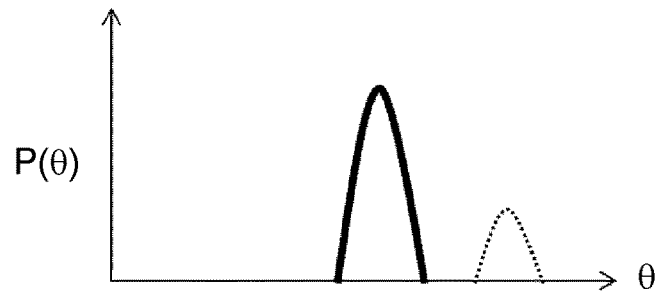
FIG. 13C is a diagram illustrating a sound pickup direction calculated on the basis of FIGS. 13A and 13B.

FIGS. 13A to 13C illustrate an example of determination of horizontal angle θ. FIG. 13A illustrates an example of a probability of a face. FIG. 13B illustrates an example of a probability of a sound source. FIG. 13C illustrates a sound pickup direction calculated on the basis of FIGS. 13A and 13B. In a case where average luminance Yave of image data v is high, image confidence CMv increases, and weight Wv for object location information increases. If noise is loud in acoustic signal s, acoustic confidence CMs decreases, and weight Ws for sound-source location information decreases. Therefore, in a case where average luminance Yave is high and in a case where noise is loud, horizontal angle θ is determined while priority is given to probability P(θ|v) of a face having a larger weight.

Figure 14A:
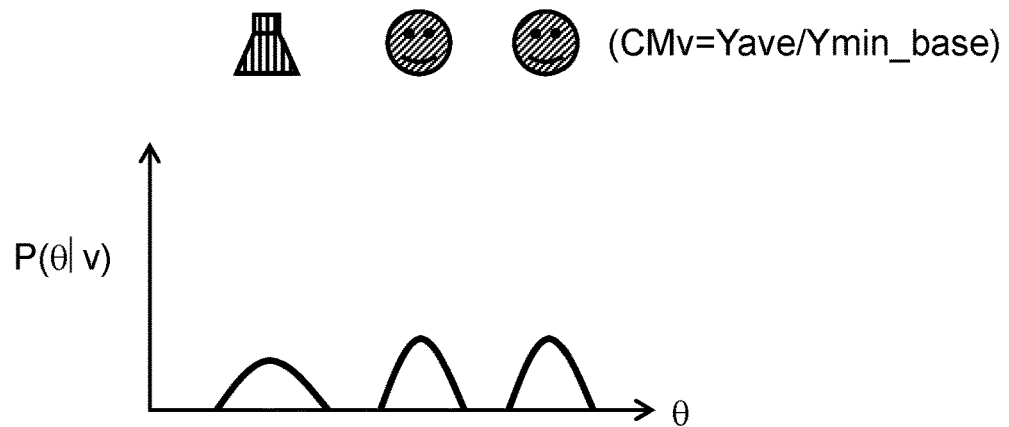
FIG. 14A is a diagram illustrating another example of a probability of a face.
Figure 14B:
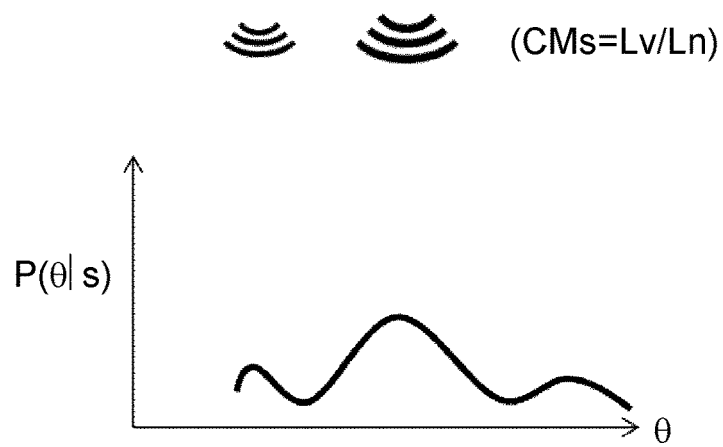
FIG. 14B is a diagram illustrating another example of a probability of a sound source.
Figure 14C:
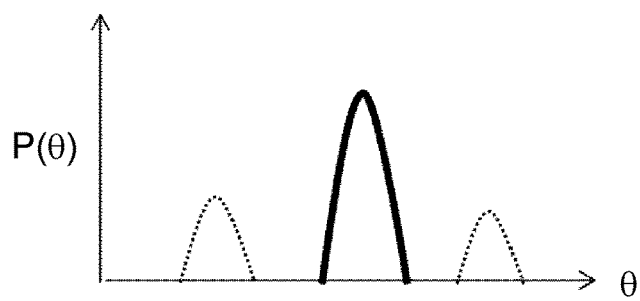
FIG. 14C is a diagram illustrating a sound pickup direction calculated on the basis of FIGS. 14A and 14B.

FIGS. 14A to 14C illustrate another example of determination of horizontal angle θ. FIG. 14A illustrates another example of a probability of a face. FIG. 14B illustrates another example of a probability of a sound source. FIG. 14C illustrates a sound pickup direction calculated on the basis of FIGS. 14A and 14B. In a case where average luminance Yave of image data v is low, image confidence CMv decreases, and weight Wv for object location information decreases. If noise is small in acoustic signal s, acoustic confidence CMs increases, and weight Ws for sound-source location information increases. Therefore, in a case where average luminance Yave is low and in a case where noise is small, horizontal angle θ is determined while priority is given to probability P(θ|s) of a sound source having a larger weight.

As illustrated in FIG. 4, beam former 37 picks up speech serving as target sound that is included in acoustic signal s on the basis of sound pickup direction θ, φ that has been determined (S7).

Note that steps S1 to S4 of FIG. 4 are performed in an arbitrary order.

3. Effects and Supplements

Sound pickup device 1 according to the present disclosure is a sound pickup device that picks up target sound that has been output from an object serving as a sound source. Sound pickup device 1 includes: a first input unit (controller 30 or input and output interface 50) that receives an input of image data v that has been generated by camera 10; a second input unit (controller 30 or input and output interface 50) that receives an input of acoustic signal s that has been output from microphone array 20; and controller 30 that determines sound pickup direction θ, φ on the basis of image data v and acoustic signal s. Controller 30 includes object location detector 31, sound-source location estimator 32, weighting unit 300, and sound direction determination unit 36. Object location detector 31 detects a location in at least one of a horizontal direction and a vertical direction of the object on the basis of image data v, and outputs object location information P(θ, φ|v) serving as information indicating the detected location of the object. Sound-source location estimator 32 estimates a location in at least one of a horizontal direction and a vertical direction of the sound source on the basis of acoustic signal s, and outputs sound-source location information P(θ, φ|s) serving as information indicating the estimated location of the sound source. Weighting unit 300 sets weight Wv according to an image capturing state of camera 10 with respect to the object location information, and sets weight Ws according to a sound receiving state of microphone array 20 with respect to the sound-source location information. Sound direction determination unit 36 determines sound pickup direction θ, φ on the basis of object location information P(θ, φ|v), weight Wv for the object location information, sound-source location information P(θ, φ|s), and weight Ws for the sound-source location information.

As described above, sound pickup direction θ, φ is determined by using weight Wv according to the image capturing state of camera 10 and weight Ws according to the sound receiving state of microphone array 20. Therefore, priority can be given to information having higher reliability from among object location information P(θ, φ|v) and sound-source location information P(θ, φ|s). Therefore, even in a case where object location information P(θ, φ|v) or sound-source location information P(θ, φ|s) has poor precision, a direction in which target sound will be picked up can be precisely determined. Thus, by extracting sound in a determined sound pickup direction from acoustic signal s that has been output from microphone array 20, the target sound can be precisely picked up.

Specifically, weighting unit 300 sets weight Wv for the object location information on the basis of image confidence CMv indicating how confident it is that the object is included in image data, and sets weight Ws for the sound-source location information on the basis of acoustic confidence CMs indicating how confident it is that the target sound is included in an acoustic signal.

Image confidence CMv has a value according to the image capturing state of camera 10. In addition, acoustic confidence CMs has a value according to the sound receiving state of microphone array 20. Therefore, by setting weights Wv, Ws on the basis of image confidence CMv and acoustic confidence CMs, weights Wv, Ws according to the image capturing state of camera 10 and the sound receiving state of microphone array 20 can be set. By doing this, a direction in which the target sound will be picked up can be precisely determined.

Second Exemplary Embodiment

Sound pickup device 1 according to the present exemplary embodiment sets weight Wv for object location information on the basis of an output of a sensor.

Figure 15:
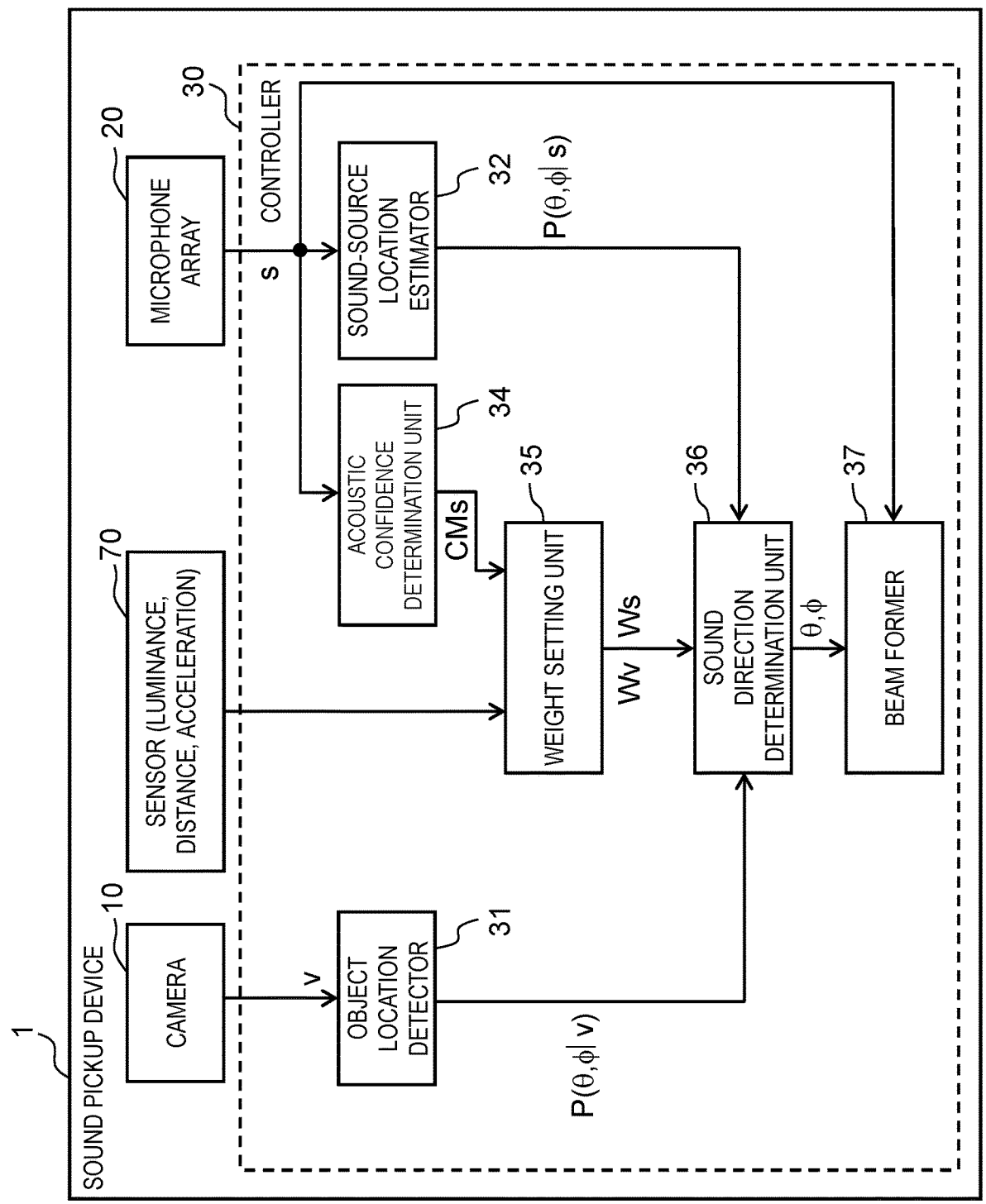
FIG. 15 is a block diagram illustrating a configuration of a sound pickup device according to a second exemplary embodiment.

FIG. 15 is a block diagram illustrating a configuration of a sound pickup device according to a second exemplary embodiment. Sound pickup device 1 according to the second exemplary embodiment includes sensor 70. Sensor 70 includes at least one of a luminance sensor that senses ambient brightness, a distance sensor that senses a distance to an object, and an acceleration sensor. Sound pickup device 1 according to the second exemplary embodiment does not include image confidence determination unit 33. Weight setting unit 35 sets weight Wv for the object location information on the basis of an output of sensor 70. For example, weight setting unit 35 may set weight Wv for the object location information on the basis of luminance sensed by the luminance sensor in such a way that weight Wv increases as the luminance increases. Weight setting unit 35 may set weight Wv for the object location information on the basis of a distance to an object that has been sensed by the distance sensor in such a way that weight Wv increases as the distance decreases. In the case of a large acceleration, there is a possibility of image blur. Therefore, weight setting unit 35 may set weight Wv for the object location information on the basis of an acceleration sensed by the acceleration sensor in such a way that weight Wv decreases as the acceleration increases.

The output of sensor 70 has a value according to the image capturing state of camera 10. Therefore, similarly in the present exemplary embodiment, a direction in which target sound will be picked up can be precisely determined.

Third Exemplary Embodiment

Sound pickup device 1 according to the present exemplary embodiment detects an utterance section from image data v, and controls sound pickup.

Figure 16:
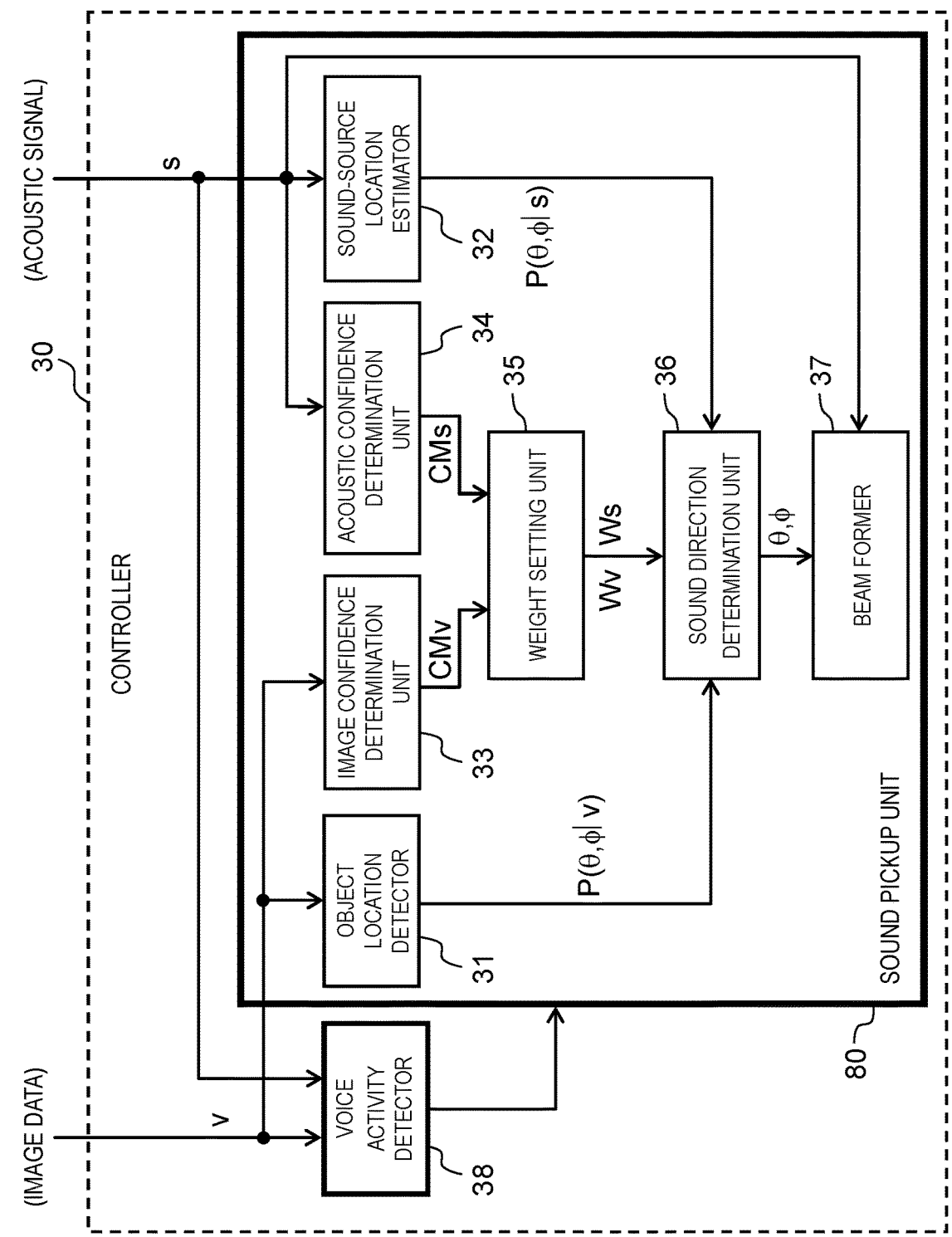
FIG. 16 is a block diagram illustrating functions of a controller according to a third exemplary embodiment.

FIG. 16 illustrates functions of controller 30 according to a third exemplary embodiment. Controller 30 according to the third exemplary embodiment includes voice activity detector 38. Voice activity detector 38 has, for example, information indicating a feature amount of a state where lips are open, and determines whether lips are open in image data v on the basis of the information. By doing this, voice activity detector 38 detects a start point in time and an end point in time of utterance. A period from the start point in time of utterance to the end point in time of utterance is an utterance section. Alternatively, acoustic signal s may be used as an input, and the utterance section may be detected on the basis of acoustic features. Alternatively, the utterance section may be detected on the basis of feature amounts of both image data v and acoustic signal s.

In FIG. 16, sound pickup unit 80 is configured by object location detector 31, sound-source location estimator 32, image confidence determination unit 33, acoustic confidence determination unit 34, weight setting unit 35, sound direction determination unit 36, and beam former 37. Sound pickup unit 80 picks up target sound within an utterance section detected by voice activity detector 38. For example, object location detector 31 may detect a location of a face from image data v that corresponds to the utterance section. Sound direction determination unit 36 may only determine a sound pickup direction within the detected utterance section. Beam former 37 may only pick up target sound from acoustic signal s that corresponds to the detected utterance section.

Note that object location detector 31 may detect the utterance section on the basis of opening and closing of lips. For example, object location detector 31 may determine opening and closing of lips in region A(θ, φ) where a face has been detected.

Fourth Exemplary Embodiment

Sound pickup device 1 according to the present exemplary embodiment sets weight Wv for probability P of a face in each of a plurality of regions within image data v. The present exemplary embodiment is described below with reference to FIGS. 2 and 17.

Object location detector 31 divides image data v into a plurality of regions, and determines whether a face is indicated in an image in each of the plurality of regions. Stated another way, object location detector 31 calculates probability P of a face being indicated in an image in each of the plurality of regions.

Figure 17:
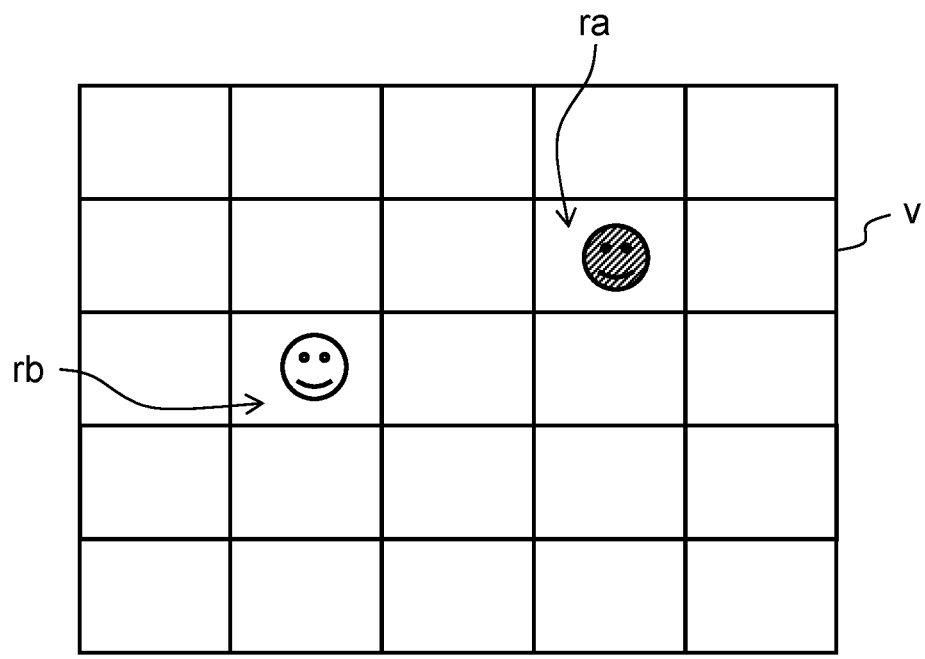
FIG. 17 is a diagram for explaining a region serving as a unit of detection of a face location according to a fourth exemplary embodiment.

In the present exemplary embodiment, as illustrated in FIG. 17, a face has been detected in two or more regions of the plurality of regions. Stated another way, region ra includes a face that is making a speech, and region rb includes a face that is not making a speech. Further, an image capturing state of camera 10 is different in each of the plurality of regions. Specifically, in an image in region ra of the plurality of regions, average luminance is excessively high or excessively low according to the image capturing state of camera 10. Such a situation occurs, for example, in a case where light is only applied strongly to a periphery of region ra or almost no light is applied to region ra. On the other hand, in an image in region rb, average luminance has an appropriate value to detect a face. Therefore, although a person included in the image in region ra is making a speech, probability P of a face included in the image in region ra is lower than probability P of a face included in the image in regions rb. In some cases, this causes it to be erroneously detected that a person in region rb is making a speech although the person is not making a speech.

In view of this, weight setting unit 35 according to the present exemplary embodiment calculates image confidence CMv in region ra that corresponds to a location of the detected face from among the plurality of regions, on the basis of average luminance in region ra. For example, in a case where the average luminance in region ra is excessively high or excessively low, weight setting unit 35 calculates image confidence CMv in region ra in such a way that image confidence CMv decreases. Then, in a case where image confidence CMv in region ra is low, weight setting unit 35 sets weight Wv for object location information in such a way that weight Wv for object location information in region ra increases. Stated another way, weight setting unit 35 sets weight Wv for the object location information in region ra on the basis of image confidence CMv in region ra.

As described above, weight setting unit 35 calculates image confidence CMv on the basis of average luminance in region ra that corresponds to a location of a person from among the plurality of regions. Therefore, for example, even in a case where the average luminance in region ra is excessively high or excessively low according to the image capturing state of region ra, a probability of a face being included in an image in region ra is appropriately calculated.

Note that weight setting unit 35 may calculate image confidence CMv on the basis of dispersion of luminance of the image in region ra instead of the average luminance.

In addition, weight setting unit 35 may set image confidence CMv to be low in a case where region ra only includes a portion of a face. Stated another way, in a case where region ra only includes a portion of a face, on the basis of image confidence CMv, weight setting unit 35 may set weight Wv for object location information in such a way that weight Wv for object location information in region ra increases. By doing this, even when occlusion has occurred in a person who is making a speech in image v, a probability of a face of the person who is making a speech is appropriately calculated.

Other Exemplary Embodiments

The first to fourth exemplary embodiments have been described above to exemplify the technique disclosed in the present application. However, a technique according to the present disclosure is not limited to these exemplary embodiments, and is applicable to exemplary embodiments in which changes, replacements, additions, omissions, or the like have been made as appropriate. In addition, a new exemplary embodiment can be formed by combining respective components described in the first to fourth exemplary embodiments. Accordingly, other exemplary embodiments are described below as examples.

In the first exemplary embodiment, weight setting unit 35 sets weight Wv for object location information and weight Ws for sound-source location information. However, the present disclosure is not limited to this. Weight setting unit 35 may only set one of weight Wv for the object location information and weight Ws for the sound-source location information. Stated another way, weighting unit 300 may only include one of image confidence determination unit 33 and acoustic confidence determination unit 34. This example is described with reference to FIGS. 18 and 19.

Figure 18:
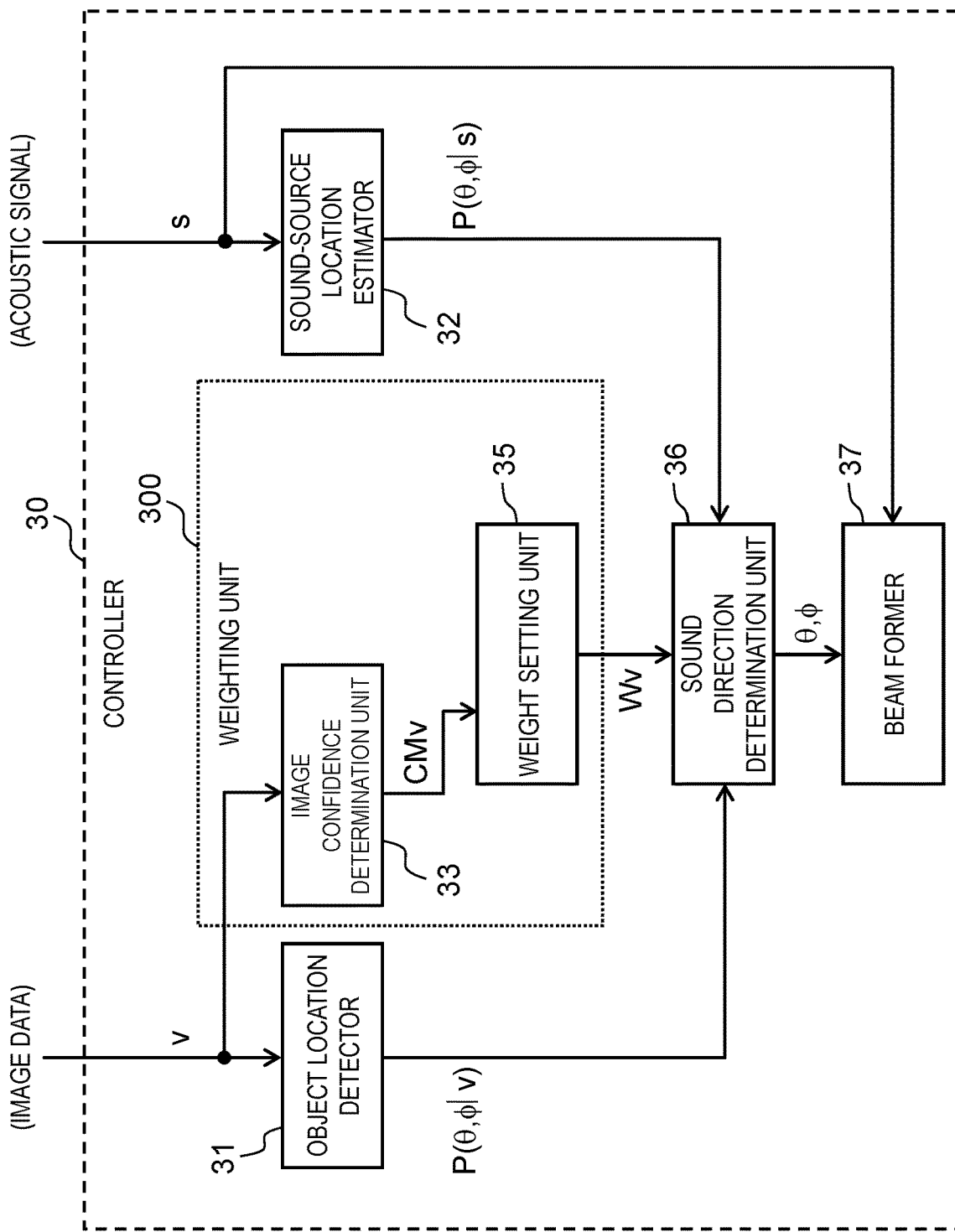
FIG. 18 is a block diagram illustrating functions of a controller according to another exemplary embodiment.

As illustrated in FIG. 18, weighting unit 300 according to another exemplary embodiment does not include acoustic confidence determination unit 34. Stated another way, weight setting unit 35 only sets weight Wv for the object location information. In this case, sound direction determination unit 36 determines a direction in which target sound will be picked up on the basis of object location information $P(\theta, \varphi|v)$, weight Wv for the object location information, and sound-source location information $P(\theta, \varphi|s)$. Specifically, sound direction determination unit 36 sets weight Ws in Formula (7) according to the first exemplary embodiment to 1. Sound direction determination unit 36 can determine a direction in which target sound will be picked up, by using Formula (7). Even in such a configuration, similarly to sound pickup device 1 according to the first exemplary embodiment, erroneous detection due to an image capturing state can be suppressed by using weight Wv for the object location information.

Figure 19:
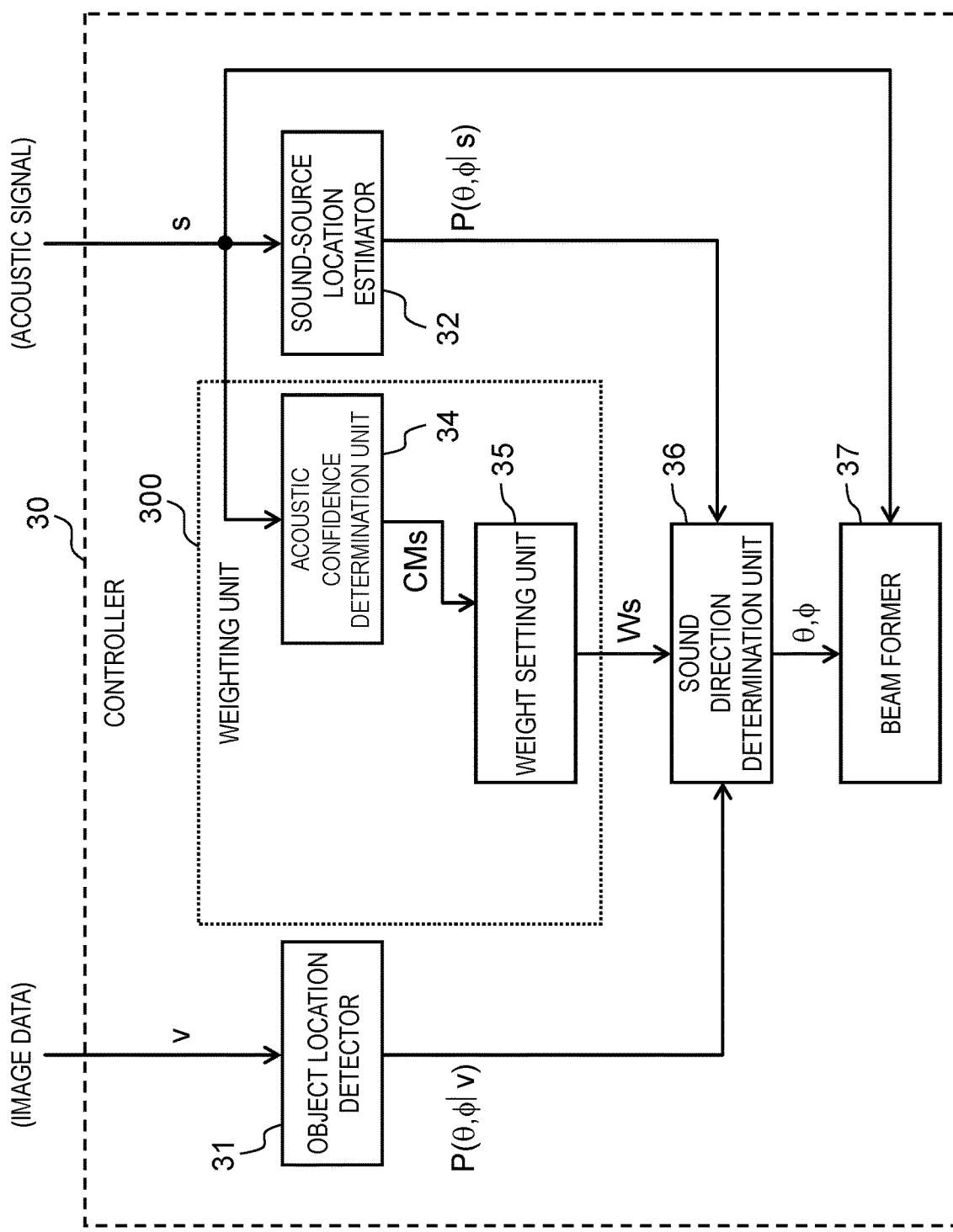
FIG. 19 is a block diagram illustrating functions of a controller according to another exemplary embodiment.

In addition, as illustrated in FIG. 19, another weighting unit 300 according to another exemplary embodiment does not include image confidence determination unit 33. Stated another way, weight setting unit 35 only sets weight Ws for sound-source location information. In this case, sound direction determination unit 36 determines a direction in which target sound will be picked up on the basis of object location information $P(\theta, \varphi|v)$, sound-source location information $P(\theta, \varphi|s)$, and weight Ws for the sound-source location information. Specifically, sound direction determination unit 36 sets weight Wv in Formula (7) according to the first exemplary embodiment to 1. Sound direction determination unit 36 can determine a direction in which target sound will be picked up, by using Formula (7). Even in such a configuration, similarly to sound pickup device 1 according to the first exemplary embodiment, erroneous detection due to a sound receiving state of microphone array 20 can be suppressed by using weight Ws for the sound-source location information.

In the first exemplary embodiment, an example where a person's face is detected has been described. However, in a case where a person's speech is picked up, an object to be detected is not limited to a person's face, and may be any part that can be recognized as a person. For example, the object to be detected may be a person's body or lips.

In the first exemplary embodiment, image confidence CMv has been determined on the basis of average luminance Yave of image data v. However, image confidence CMv may be determined by using another method. For example, image confidence CMv may be determined on the basis of dispersion of luminance of image data v. Specifically, for example, if dispersion Ystd of luminance of image data v is less than recommended dispersion Ystd_base, image confidence determination unit 33 sets image confidence CMv to "Ystd/Ystd_base". If dispersion Ystd is greater than or equal to recommended dispersion Ystd_base, image confidence determination unit 33 sets image confidence CMv to "1".

As yet another method for determining image confidence CMv, a luminance histogram of image data v may be used. For example, when the luminance histogram is concentrated on a low luminance or a high luminance, image confidence CMv is set to be low. When the luminance histogram is widely dispersed within a range from a low luminance to a high luminance, image confidence CMv is set to be high.

In addition, image confidence CMv may be determined on the basis of whether image data v is in focus.

In the first exemplary embodiment, acoustic confidence CMs has been determined on the basis of likelihood Lv of a speech GMM and likelihood Ln of a non-speech GMM. However, acoustic confidence CMs may be determined by using another method. For example, acoustic confidence determination unit 34 may divide acoustic signal s into speech and non-speech by using a sound-source separation technology, and may calculate acoustic confidence CMs on the basis of a power ratio of speech and non-speech. As the sound-source separation technology, blind source separation may be used, for example.

In the first exemplary embodiment, weights Wv, Ws have been set on the basis of condences CMv, CMs. However, weights Wv, Ws may have the same values as values of condences CMv, CMs.

In the exemplary embodiments described above, if both image confidence CMv and acoustic confidence CMs are, for example, less than or equal to a predetermined value, previously set sound pickup direction θ, φ may be determined as a sound pickup direction of this time.

In the exemplary embodiments described above, a case where horizontal angle θ and vertical angle φ are determined as a sound pickup direction has been described. However, in a case where a location of an object that emits target sound can be specified by only using at least one of horizontal angle θ and vertical angle φ, only at least one of horizontal angle θ and vertical angle φ may be determined.

In the exemplary embodiments described above, a person's speech has been picked up as target sound. However, the target sound is not limited to a person's speech. For example, the target sound may be sound of a vehicle or a cry of an animal. In a case where the target sound is sound of a vehicle, probability P(θ, φ|v) of an image in region r(θ, φ) indicating a vehicle may be calculated on the basis of information indicating features of the vehicle. In addition, acoustic confidence CMs may be set on the basis of a GMM of the sound of the vehicle.

Summary of Exemplary Embodiments (1) A sound pickup device according to the present disclosure is a sound pickup device that picks up target sound that has been output from an object serving as a sound source. The sound pickup device includes: a first input unit that receives an input of image data (v) that has been generated by a camera; a second input unit that receives an input of acoustic signal (s) that has been output from a microphone array; and a controller that determines direction (θ, φ) in which the target sound will be picked up on the basis of image data (v) and acoustic signal (s). The controller includes a detector, an estimator, a weighting unit, and a determination unit. The detector detects a location in at least one of a horizontal direction and a vertical direction of the object on the basis of image data (v), and outputs object location information (P(θ, φ|v)) including information that indicates the detected location of the object. The estimator estimates a location in at least one of a horizontal direction and a vertical direction of the sound source on the basis of acoustic signal (s), and outputs sound-source location information (P(θ, φ|s)) including information that indicates the estimated location of the sound source. The weighting unit sets weight (Wv) for the object location information according to an image capturing state of the camera. The determination unit determines direction (θ, φ) in which the target sound will be picked up on the basis of object location information (P(θ, φ|v)), weight (Wv) for the object location information, and sound-source location information (P(θ, φ|s)).

By doing this, reliability of object location information P(θ, φ|v) is considered, and therefore a direction in which target sound will be picked up can be precisely determined. Thus, by extracting sound in a determined sound pickup direction from acoustic signal s that has been output from microphone array 20, the target sound can be precisely picked up.

(2) In the sound pickup device of (1), the weighting unit may set the weight for the object location information on the basis of image confidence (CMv) indicating how confident it is that the object is included in the image data.

By doing this, weight (Wv) according to an image capturing state of the camera can be precisely set for the object location information.

(3) In the sound pickup device of (2), the weighting unit may calculate image confidence (CMv) on the basis of average luminance or dispersion of luminance of the image data.

By doing this, weight (Wv) according to an illumination environment at the time of image capturing can be precisely set.

(4) In the sound pickup device of (2), the detector may divide the image data into a plurality of regions, and the weighting unit may calculate the image confidence on the basis of average luminance or dispersion of luminance of one region of the plurality of regions, the one region corresponding to the detected location of the object.

By doing this, even in a case where average luminance in a region is excessively high or excessively low according to an image capturing state of the region, a probability of the object being included in an image in the region can be appropriately calculated.

(5) In the sound pickup device of (1) to (4), the weighting unit may set a weight for the sound-source location information according to a sound receiving state of the microphone array, and the determination unit may determine the direction in which the target sound will be picked up on the basis of the object location information, the weight for the object location information, the sound-source location information, and the weight for the sound-source location information.

By doing this, priority is given to information having higher reliability from among object location information P(θ, φ|v) and sound-source location information P(θ, φ|s), and therefore the direction in which the target sound will be picked up can be precisely determined. Thus, by extracting sound in a determined sound pickup direction from acoustic signal s that has been output from microphone array 20, the target sound can be precisely picked up.

(6) In the sound pickup device of (5), the weighting unit may set the weight for the sound-source location information on the basis of acoustic confidence (CMs) indicating how confident it is that the target sound is included in the acoustic signal.

By doing this, weight (Ws) according to a sound receiving state of the microphone array can also be precisely set for the sound-source location information.

(7) In the sound pickup device of (6), the weighting unit may calculate acoustic confidence (CMs) on the basis of a likelihood ratio or a power ratio of the target sound and non-target sound that are included in the acoustic signal.

By doing this, weight (Ws) according to an ambient state at the time of receiving sound can be precisely set.

(8) The sound pickup device of (1) may further include a sensor that includes at least one of a luminance sensor that senses ambient brightness, a distance sensor that senses a distance to the object, and an acceleration sensor.

The weighting unit may set weight (Ws) for the object location information on the basis of an output of the sensor.

By doing this, weight (Wv) according to a state at the time of image capturing can be precisely set.

(9) The sound pickup device of (1) may include at least one of the camera and the microphone array.

By doing this, the target sound can be precisely picked up, for example, by only externally attaching the microphone array to a sound pickup device including the camera.

(10) In the sound pickup device of (1), the detector may detect, as the object, a body, a face, or lips of a person.

This enables the person's speech to be precisely picked up.

(11) In addition, another sound pickup device according to the present disclosure is a sound pickup device that picks up target sound that has been output from an object serving as a sound source. The sound pickup device includes: a first input unit that receives an input of image data (v) that has been generated by a camera; a second input unit that receives an input of acoustic signal (s) that has been output from a microphone array; and a controller that determines direction (θ, φ) in which the target sound will be picked up on the basis of image data (v) and acoustic signal (s). The controller includes a detector, an estimator, a weighting unit, and a determination unit.

The detector detects a location in at least one of a horizontal direction and a vertical direction of the object on the basis of image data (v), and outputs object location information (P(θ, φ|v)) including information that indicates the detected location of the object. The estimator estimates a location in at least one of a horizontal direction and a vertical direction of the sound source on the basis of acoustic signal (s), and outputs sound-source location information (P(θ, φ|s)) including information that indicates the estimated location of the sound source. The weighting unit sets a weight for the sound-source location information according to a sound receiving state of the microphone array. The determination unit determines direction (θ, φ) in which the target sound will be picked up on the basis of object location information (P(θ, φ|v)), sound-source location information (P(θ, φ|s)), and weight (Ws) of the sound-source location information.

By doing this, reliability of sound-source location information (P(θ, φ|s)) is considered, and therefore a direction in which target sound will be picked up can be precisely determined. Thus, by extracting sound in a determined sound pickup direction from acoustic signal s that has been output from microphone array 20, the target sound can be precisely picked up.

(12) A sound pickup method according to the present disclosure is a sound pickup method for picking up target sound that has been output from an object serving as a sound source. The sound pickup method includes: receiving an input of image data (v) that has been generated by a camera; receiving an input of acoustic signal (s) that has been output from a microphone array; detecting a location in at least one of a horizontal direction and a vertical direction of the object on the basis of image data (v), and outputting object location information (P(θ, φ|v)) including information that indicates the detected location of the object; estimating a location in at least one of a horizontal direction and a vertical direction of the sound source on the basis of acoustic signal (s), and outputting sound-source location information (P(θ, φ|s)) including information that indicates the estimated location of the sound source; setting weight (Wv) for the object location information according to an image capturing state of the camera; and determining direction (θ, φ) in which the target sound will be picked up on the basis of object location information (P(θ, φ|v)), weight (Wv) for the object location information, and sound-source location information (P(θ, φ|s)).

By doing this, reliability of object location information P(θ, φ|v) is considered, and therefore a direction in which target sound will be picked up can be precisely determined. Thus, by extracting sound in a determined sound pickup direction from acoustic signal s that has been output from microphone array 20, the target sound can be precisely picked up.

(13) In addition, another sound pickup method according to the present disclosure is a sound pickup method for picking up target sound that has been output from an object serving as a sound source. The sound pickup method includes: receiving an input of image data (v) that has been generated by a camera; receiving an input of acoustic signal (s) that has been output from a microphone array; detecting a location in at least one of a horizontal direction and a vertical direction of the object on the basis of image data (v), and outputting object location information (P(θ, φ|v)) including information that indicates the detected location of the object; estimating a location in at least one of a horizontal direction and a vertical direction of the sound source on the basis of acoustic signal (s), and outputting sound-source location information (P(θ, φ|s)) including information that indicates the estimated location of the sound source; setting weight (Ws) for the sound-source location information according to a sound receiving state of the microphone array; and determining direction (θ, φ) in which the target sound will be picked up on the basis of object location information (P(θ, φ|v)), sound-source location information (P(θ, φ|s)), and weight (Ws) for the sound-source location information.

By doing this, reliability of sound-source location information P(θ, φ|s) is considered, and therefore a direction in which target sound will be picked up can be precisely determined. Thus, by extracting sound in a determined sound pickup direction from acoustic signal s that has been output from microphone array 20, the target sound can be precisely picked up.

(14) A program according to the present disclosure causes a computer to perform the sound pickup method described above.

A sound pickup device and a sound pickup method according to all of the claims of the present disclosure are implemented by, for example, cooperation between hardware resources, such as a processor or a memory, and a program.

INDUSTRIAL APPLICABILITY

A sound pickup device according to the present disclosure is useful, for example, as a device that picks up speech of a person who is making conversation.

REFERENCE MARKS IN THE DRAWINGS 1 sound pickup device
10 camera
20 microphone array
30 controller
31 object location detector
32 sound-source location estimator
33 image confidence determination unit
34 acoustic confidence determination unit
35 weight setting unit
36 sound direction determination unit
37 beam former
38 voice activity detector
40 storage
50 input and output interface
60 bus
70 sensor
300 weighting unit

The invention claimed is:

1. A sound pickup device that picks up target sound that has been output from an object, the sound pickup device comprising:
    a first input unit that receives image data that has been generated by a camera;
    a second input unit that receives an acoustic signal that has been output from a microphone array and includes the target sound and non-target sound;
    a sensor that includes at least one of a distance sensor that senses a distance to the object or an acceleration sensor that senses an acceleration of the camera to determine whether an image taken by the camera is sufficient to find a sound source; and
    a controller that determines a direction that the target sound is to be picked up in,
    wherein the controller includes:
        a detector that detects a location in at least one of a horizontal direction and a vertical direction of the object based on a probability of matching between a partial region in the image data and features of the object, and outputs object location information including information that indicates the location that has been detected of the object;
        an estimator that estimates a location in at least one of a horizontal direction and a vertical direction of a sound source of the target sound or the non-target sound based on a probability of a presence of the sound source in a predetermined location in the acoustic signal, and outputs sound-source location information including information that indicates the location that has been estimated of the sound source;
        a weighting unit that sets a weight for the object location information based on an output of the sensor and a weight for the sound-source location information in accordance with a first likelihood of first information in sound included in the acoustic signal, the first information including information relating to the target sound; and
        a determination unit that determines the direction that the target sound is to be picked up in based on the object location information, the weight for the object location information, the sound-source location information, and the weight for the sound-source location information.

2. The sound pickup device according to claim 1, further comprising a storage that stores the first information.

3. The sound pickup device according to claim 2, wherein the storage stores second information including information relating to the non-target sound, and
the weighting unit sets the weight for the sound-source location information based on a ratio of the first likelihood and a likelihood of the second information relating to the non-target sound.

4. The sound pickup device according to claim 1, wherein
the weighting unit sets the weight for the object location information in accordance with an image capturing state of the camera that causes a change in precision of detecting a location of the object from the image data, and
the determination unit determines the direction that the target sound is to be picked up in based on the object location information, the weight for the object location information, the sound-source location information, and the weight for the sound-source location information.

5. The sound pickup device according to claim 4, wherein the weighting unit sets the weight for the object location information based on image confidence indicating how confident it is that the object is included in the image data.

6. The sound pickup device according to claim 5, wherein the weighting unit calculates the image confidence based on average luminance or dispersion of luminance of the image data.

7. The sound pickup device according to claim 5, wherein
the detector divides the image data into a plurality of regions, and
the weighting unit calculates the image confidence based on average luminance or dispersion of luminance of one region of the plurality of regions, the one region corresponding to the location that has been detected of the object.

8. The sound pickup device according to claim 1, further comprising at least one of the camera and the microphone array.

9. The sound pickup device according to claim 1, wherein
the detector outputs the object location information based on the partial region of the image data in which a body, a face, or lips of a person is detected as the object, and
the estimator outputs the sound-source location information based on a direction that a Gaussian mixture model (GMM) of speech of the person is included in the acoustic signal in, the person's speech GMM including the first information.

10. The sound pickup device according to claim 1, wherein
the sensor includes the distance sensor, and
the weighting unit sets the weight for the object location information based on the distance sensed by the distance sensor.

11. The sound pickup device according to claim 1, wherein
the sensor includes the acceleration sensor, and
the weighting unit sets the weight for the object location information based on the acceleration sensed by the acceleration sensor.

12. A sound pickup method for picking up target sound that has been output from an object, the sound pickup method comprising:

receiving image data that has been generated by a camera;

receiving an acoustic signal that has been output from a microphone array and includes the target sound and non-target sound;

sensing a distance to the object or an acceleration of the camera to determine whether an image taken by the camera is sufficient to find a sound source;

detecting a location in at least one of a horizontal direction and a vertical direction of the object based on a probability of matching between a partial region in the image data and features of the object, and outputs object location information including information that indicates the location that has been detected of the object;

estimating a location in at least one of a horizontal direction and a vertical direction of a sound source of the target sound or the non-target sound based on a probability of a presence of the sound source in a predetermined location in the acoustic signal, and outputs sound-source location information including information that indicates the location that has been estimated of the sound source;

setting a weight for the object location information based on a result of the sensing and a weight for the sound-source location information in accordance with a first likelihood of first information in sound included in the acoustic signal, the first information including information relating to the target sound; and determining a direction that the target sound is to be picked up in based on the object location information, the weight for the object location information, the sound-source location information, and the weight for the sound-source location information.

13. A non-transitory recording medium storing a program that causes a computer to perform the sound pickup method according to claim 12.

* * * * *